Nov. 4, 1947.  E. L. HART  2,430,335
AUTOMOBILE AIR-CONDITIONING APPARATUS
Filed March 30, 1944  2 Sheets-Sheet 1
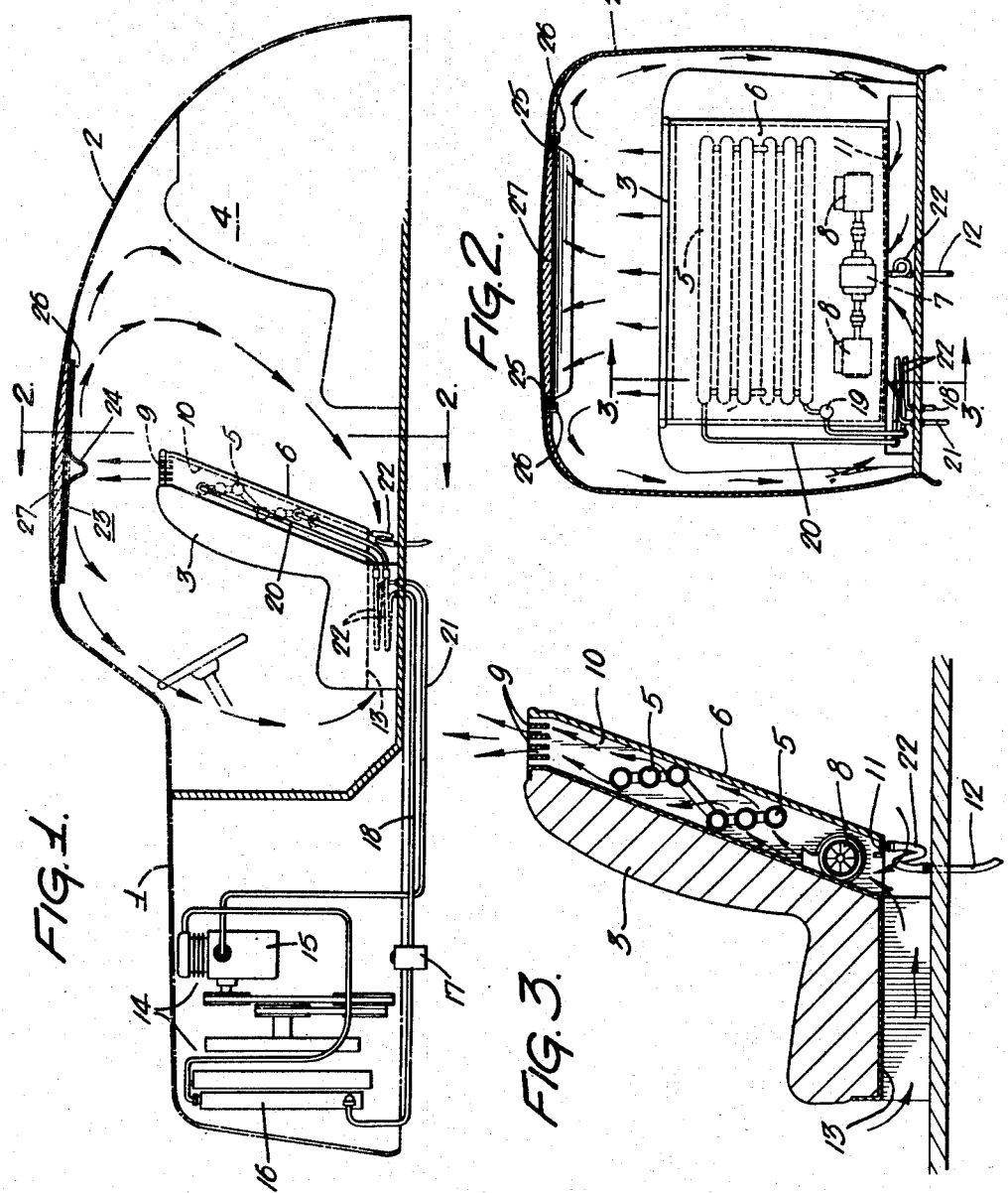
Inventor:
Edward L. Hart
by his Attorneys
Howson & Howson Nov. 4, 1947.　　　　　E. L. HART　　　　　2,430,335
AUTOMOBILE AIR-CONDITIONING APPARATUS
Filed March 30, 1944　　　2 Sheets-Sheet 2

Inventor:
Edward L. Hart
by his Attorneys
Howson & Howson

Patented Nov. 4, 1947

2,430,335

UNITED STATES PATENT OFFICE 2,430,335

AUTOMOBILE AIR-CONDITIONING APPARATUS

Edward L. Hart, Philadelphia, Pa., assignor, by mesne assignments, to Philco Corporation, Philadelphia, Pa., a corporation of Pennsylvania Application March 30, 1944, Serial No. 528,751

2 Claims. (Cl. 98—2)

This invention relates to air conditioning and, more particularly, to novel apparatus for conditioning air within automobiles and like vehicles.

Because of the compact arrangement of seats and other elements within the small space afforded by the tonneau of an automobile, there have been some substantial problems related to the proper distribution of air therewith, and it is a primary object of this invention to provide a vehicle air conditioning apparatus, having novel means for effecting distribution of the cooling air.

Broadly, it is an object of the present invention to provide an air conditioning system for automobiles and the like, which permits of considerable latitude in the distribution of the cooling air; the system further being such that any desired distribution may be established, with any one of a number of positions of the driver's seat.

More specifically, the invention has as an object the provision of an automobile air conditioning unit in which the cooling air may be directed to either the front or rear portion of the automobile, or evenly distributed between said two areas.

A further object of the invention resides in the provision of an apparatus of the above type having readily adjustable means for determining the path of cooling air within the automobile, which means provides unimpeded flow of the cooling air being discharged within said automobile.

It is also an object of the present invention to provide such an apparatus, in which the desired position of adjustment may be determined visually without inconvenience to the operator.

The invention is also concerned with a novel association of the air conditioning evaporator with the seat structure of the automobile, whereby to promote more effective heat transfer between said evaporator and the air passing thereover.

These and other objects and advantages of the invention will be more clearly understood by reference to the following description and accompanying drawings, in which:

Fig. 1 is a more or less diagrammatic sectional view of an automobile embodying the invention;

Fig. 2 is a sectional view taken on a line 2—2 of Fig. 1;

Fig. 3 is an enlarged sectional view of the front seat unit taken on the line 3—3 of Fig. 2.

Figure 4:
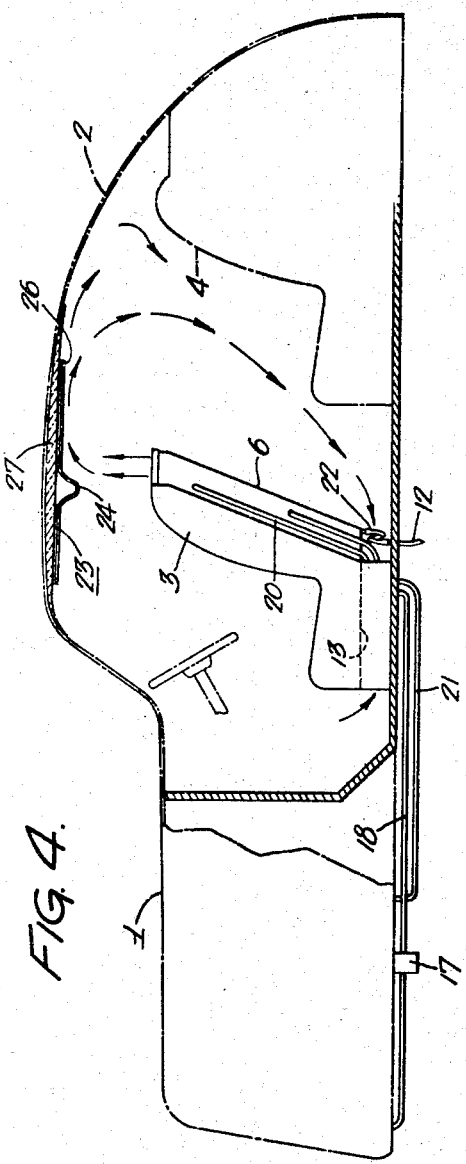
Figs. 4 and 5 are views similar to Fig. 1, and illustrating the air flow distribution means of the present invention in different positions of adjustment.

Referring first to Figs. 1 to 3 of the drawings, the automobile therein illustrated includes a hood 1, and a tonneau portion indicated generally by the reference character 2, said tonneau portion containing forward and rear seats, 3 and 4, respectively, arranged in accordance with conventional practice. An evaporator 5 is attached to the upright portion of the front seat 3 and, as illustrated, is preferably concealed within the seat structure by a sheet 6 which, in the embodiment illustrated extends completely across the width of the seat. This sheet 6 is secured to the rear portion of the seat structure in any desired manner and forms the outer or rear wall of an air flow passage 10 through which air may be moved in heat exchange relation with the evaporator, by means, for example, of a motor 7 and associated blowers 8, 8. As indicated in the drawings by arrows, the circulating air is drawn into the lower portion of the flow passage under the influence of the blowers 8, is forced upwardly past the cooling coils 5, and is discharged from the upper end of the passage through louvers 9 toward the roof of the tonneau.

A flange 11 at the lower edge of the sheet 6 forms a trough which serves to collect condensate formed on, and dripping from, the evaporator coils, and a drain passage 12 connects to the trough and extends downwardly through the floor of the tonneau for discharge of said condensate from the car.

The forward or driver's seat may be, and preferably is, mounted in a manner as to permit adjustment of said seat fore and aft of the tonneau compartment. This type of adjustable mounting is conventional and since the invention is not concerned with such mountings, per se, illustration of the details thereof is not deemed necessary herein. However, it should be noted that the lower portion 13 of the seat is spaced somewhat from the floor of the compartment in order to permit flow of air thereunder.

While it will be apparent that any one of a variety of refrigerant compressing and condensing systems may be employed in conjunction with the evaporator 5, the essentials of one such system are indicated at 14 (see Fig. 1). The compressor and condenser indicated respectively by the reference numerals 15 and 16, may be conveniently arranged within the hood 1 as illustrated. Liquefied refrigerant is delivered from the condenser 16 through a receiver 17 and a feed line 18 to the evaporator 5 by way of the restrictor shown at 19 in Fig. 2. After the refrigerant has been volatilized in the evaporator, it is returned to the compressor through a suction line, including downwardly and forwardly extending portions 20 and 21, respectively.

While the invention, in its broader aspect, is not limited to the use of any particular evaporator, it should be noted that the various passes of tubing which comprise the evaporator 5 are arranged in relatively staggered groups. This is advantageous, in that it causes the air to flow in a tortuous path around the evaporator, and thereby increases the heat transfer between said evaporator and the moving air.

To permit longitudinal adjustment of the driver's seat, referred to above, the suction and feed lines, as well as the drain pipe 12, may each have an elongated flexible portion, indicated generally at 22, said flexible portions being interposed between the stationary lines and the relatively movable evaporator and seat structure.

Figure 5:
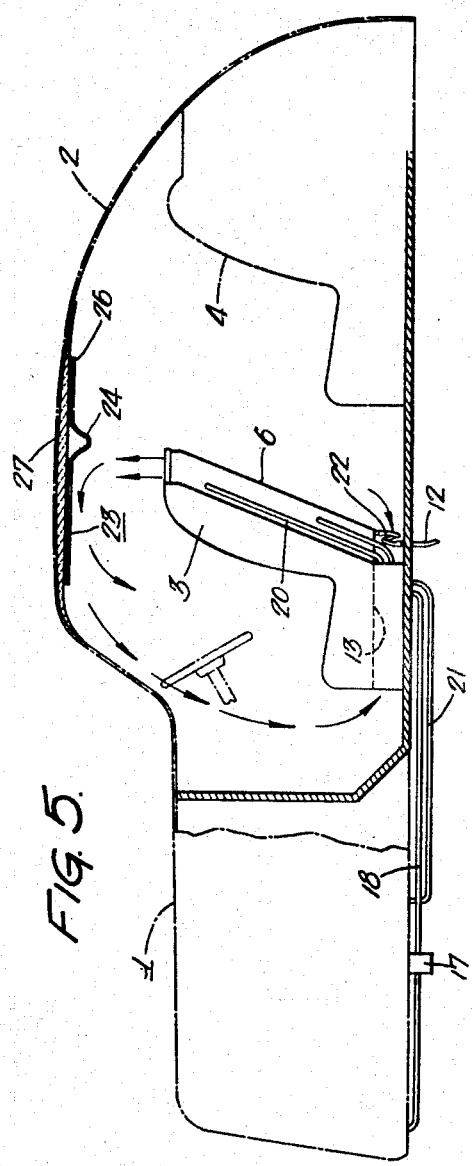

In accordance with the present invention, an air deflecting structure 23 is provided above and remote to the upper end of the passage 10 with structure including a depending projection 24 which, as shown in Fig. 2, extends across a substantial portion of the width of the roof of the tonneau 2. This deflector, as indicated in Figs. 1, 4 and 5, may be adjusted fore and aft of the tonneau compartment, and to this end, the side edges 25, 25 of the deflector are slidably mounted in guide channels 26, 26, fixed to the roof of the tonneau. Insulating material 27 is preferably secured to the roof in the generally mid-portion of the toneau, the upper surface of the deflector 24 being arranged to slide along under surface of said insulation. The adjustable portion of the deflector structure is readily accessible from any position within the automobile, and it will be apparent that its relatively large, smoothly contoured air-deflecting surfaces are highly effective in establishing a desired distribution of circulated air within the tonneau, while offering no interference with the relatively high velocity flow of air from the upper end of the passage 10.

As shown by the arrows appearing in the several figures of the drawings, the deflector 24 may be positioned so as to direct virtually all of the circulating air either to the forward or rearward areas of the tonneau, as may be desired; or it may be positioned centrally with respect to the air discharged from passage 10 so as to divide the cooling air equally between said areas.

From the foregoing description, it will be apparent that the invention provides an automobile air-conditioning system which is capable of a wide regulation as to air distribution, without impeding or otherwise adversely affecting the flow of air from the air discharge channel. In addition, it is possible to obtain a desired regulation rapidly and accurately by simple observation of the location of the deflector structure with respect to the upper end of the passage 10.

I claim:

1. In an automobile or like vehicle having an enclosed passenger compartment and means for discharging air interiorly toward an intermediate area of the roof of said compartment, and means depending from the roof within said area for directing the air fore and aft of said compartment, said depending means being mounted for adjustment in the fore and aft direction, thereby to variably regulate the distribution of air within said compartment.

2. A construction in accordance with claim 1, wherein said depending air-directing means extends transversely across a major portion of the width of the compartment and is provided with smoothly contoured surfaces flaring upwardly toward the roof of the vehicle.

EDWARD L. HART.

REFERENCES CITED

The following references are of record in the file of this patent:

UNITED STATES PATENTS

| Number | Name | Date |
|---|---|---|
| 2,185,855 | Kysor | Jan. 2, 1940 |
| 2,315,636 | McCollum | Apr. 6, 1943 |
| 2,134,724 | McClanahan et al. | Nov. 1, 1938 |
| 2,236,475 | Findley | March 25, 1941 |
| 2,301,512 | Breese | Nov. 10, 1942 |
| 2,336,089 | Gould | Dec. 7, 1943 |
| 2,172,939 | Lintern et al. | Sept. 12, 1939 |
| 2,127,991 | Candor | Aug. 23, 1938 |
| 2,212,468 | Ferris | Aug. 20, 1940 |
| 2,315,154 | Fenner | Mar. 30, 1943 |
| 2,350,514 | Livar | June 6, 1944 |
| 1,513,881 | Ayres | Nov. 4, 1924 |
| 2,232,573 | Teves | Feb. 18, 1941 |
| 2,342,872 | Le Fevre et al. | Feb. 29, 1944 |
| 2,249,946 | Darrah et al. | July 22, 1941 |

FOREIGN PATENTS

| Number | Country | Date |
|---|---|---|
| 722,493 | France | Dec. 29, 1931 |
| 305,088 | Great Britain | Dec. 12, 1929 |